United States Patent [19]
De Graff

[11] 3,959,085
[45] *May 25, 1976

[54] FRACTIONATION APPARATUS HAVING TWO INTEGRAL AND CONCENTRIC FRACTIONATING UNITS

[75] Inventor: Richard R. De Graff, Arlington Heights, Ill.

[73] Assignee: Universal Oil Products Company, Des Plaines, Ill.

[ * ] Notice: The portion of the term of this patent subsequent to Oct. 29, 1991, has been disclaimed.

[22] Filed: June 6, 1974

[21] Appl. No.: 476,984

Related U.S. Application Data
[63] Continuation of Ser. No. 320,247, Jan. 2, 1973, Pat. No. 3,844,898.

[52] U.S. Cl. ............................. 202/154; 202/155; 202/158; 196/100; 203/DIG. 19
[51] Int. Cl.² .......................................... B01D 3/26
[58] Field of Search .......... 202/154, 155, 158, 161; 203/99, 71, 81, 74, DIG. 19, 100; 196/100, 105, 139; 208/354; 62/23

[56] References Cited
UNITED STATES PATENTS
| | | |
|---|---|---|
| 1,257,470 | 2/1918 | Filippo et al. .......................... 202/158 |
| 1,919,599 | 7/1933 | Schonberg .......................... 202/158 |
| 2,134,836 | 11/1938 | Ostergaard .......................... 196/139 |
| 2,578,469 | 12/1951 | Goldsbarry et al. ................. 196/105 |
| 3,412,016 | 11/1968 | Graven ................................ 202/158 |
| 3,489,649 | 1/1970 | Weiss ................................... 202/161 |
| 3,502,547 | 3/1970 | Bridgeford .......................... 202/158 |
| 3,544,428 | 12/1970 | Mellbom ............................ 202/158 |
| 3,844,898 | 10/1974 | De Graff ............................. 202/154 |

*Primary Examiner*—Wilbur L. Bascomb, Jr.
*Attorney, Agent, or Firm*—James R. Hoatson, Jr.; Robert W. Erickson; William H. Page, II

[57] ABSTRACT

Insertion of about one-half of a small diameter distillation column through the bottom of a larger diameter column permits the fractionation of a feed stream fed to the small column into three distinct high purity streams within one vessel. An annular space between the two columns functions as a stripping section which produces a pure stream of intermediate boiling range material. Open communication between the columns at the top of the small column eliminates the requirement of having a separate reflux system for the small column.

3 Claims, 1 Drawing Figure

U.S. Patent May 25, 1976 3,959,085
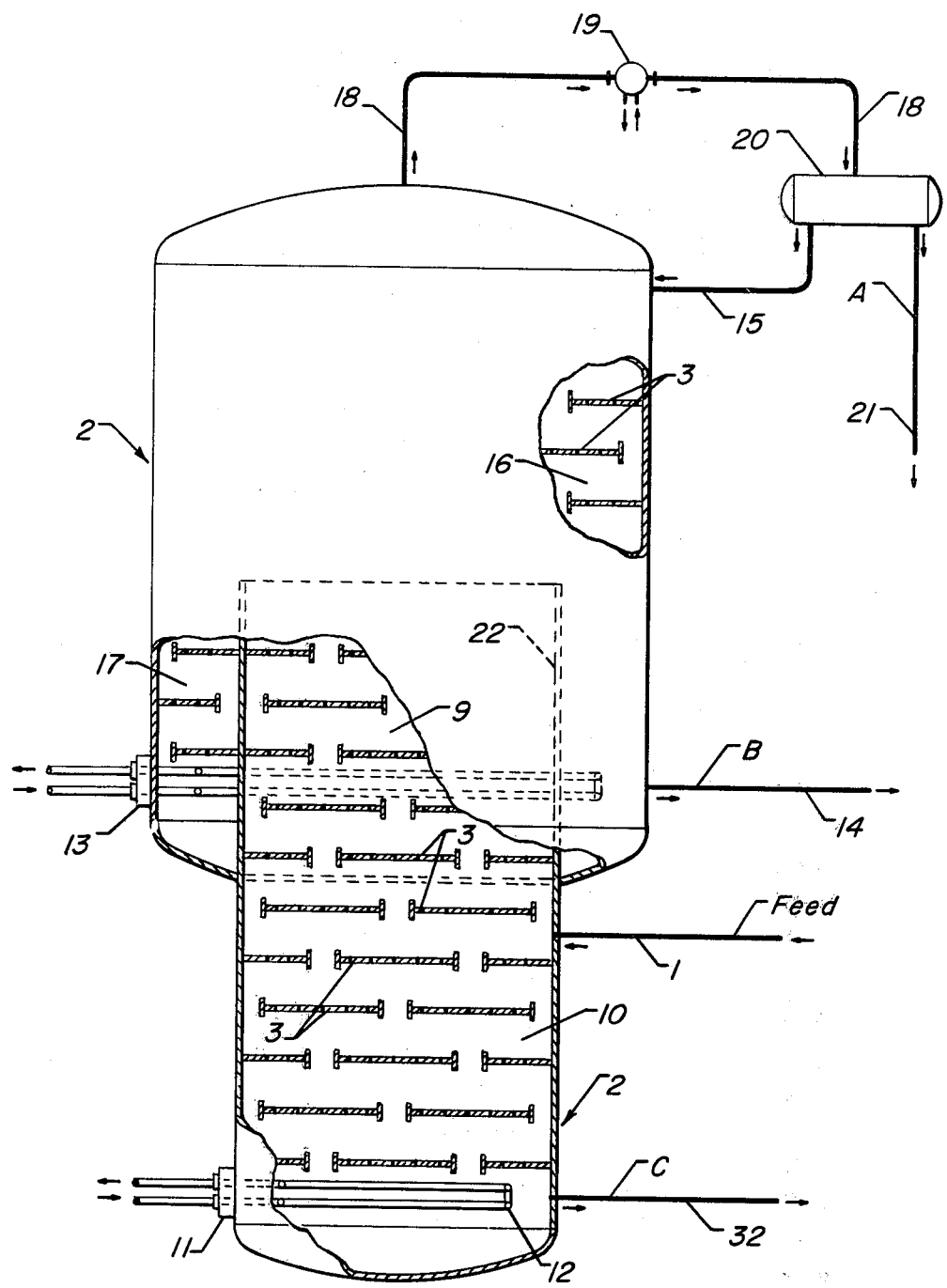

FRACTIONATION APPARATUS HAVING TWO INTEGRAL AND CONCENTRIC FRACTIONATING UNITS

CROSS-REFERENCE TO RELATED APPLICATION

This application is a Continuation of my copending application Ser. No. 320,247, filed Jan. 2, 1973, now U.S. Pat. No. 3,844,898, all the teachings of which application are incorporated herein by this specific reference thereto.

BACKGROUND OF THE INVENTION

1. Field of the Invention

The invention relates to an apparatus for the fractional distillation of hydrocarbons or other organic compounds, and is specifically directed to a single vessel apparatus in which fractional distillation is performed to produce more than two high purity product streams, and which contains two rectification zones and two stripping zones.

2. Description of the Prior Art

There is a large body of knowledge in the field of fractionation, wherein the uniformly used method to produce three separate high purity fractions employs two distinct vessels, such as two columns, connected to separate out one fraction from the mixture in a first column, and to separate the other two fractions in the second column. The apparatus of the present invention uses only one vessel, but has more than one rectification and stripping section located within this vessel. In the prior art, a separate external reflux system is located at the top of each rectification section and each column rests on a separate foundation. The prior art also includes stacking two fractionation units within the same vessel to reduce capital costs. The present invention is distinguished by the open communication between the units, and by the telescopic insertion of the two columns to form an annular stripping section between the stabbed in top portion of the lower fractionation unit and the bottom portion of the top fractionation unit.

SUMMARY OF THE INVENTION

By the vertical interposition of two distinct fractionation units in a single vessel, space requirements and construction costs are reduced. The invention in the preferred embodiment comprises a topless small diameter fractionation tower which is stabbed into the bottom of a larger diameter column to form an annular overlap for about one-half the height of each column. The rectification section of the bottom column is therefore at least partially within the innermost volume of the annulus, and the outermost volume of the annulus is the stripping section of the upper column. Descending liquid from the upper column is utilized as reflux for the rectification section of the bottom column and therefore no reflux system is needed for the bottom column. A separate high purity stream having an intermediate boiling range is produced as a bottoms product from the outer portion of the annulus in addition to the normal top and bottom streams.

DESCRIPTION OF THE DRAWING

The drawing depicts the usage of the preferred embodiment of the invention to fractionate a feed stream entering by line 1 into three high purity product streams labeled A, B and C. In the sectioned part of the drawing, a number of the needed fractionation trays 3 are shown in the different zones. The feed stream enters the unitary outer vessel 2 at a point between the ends of the lower column. This outer vessel contains a small diameter lower column and a larger diameter upper column. The feed point to the lower column, also referred to as the lower fractionation unit, divides the lower column into a stripping section 10 below the feed point, and a rectification section 9 above the feed point and within the lower column's continuing walls 22. By the normal fractionation process, the heaviest compound, C, is concentrated in the descending liquid within the lower column, and the more volatile compounds are vaporized and passed upward. The heat needed for this is supplied by a reboiler means 11 located in the bottom of the apparatus close to the point at which line 32 is used to remove a stream of high purity C. Two circular heat-exchangers 12 connected at their extreme point are used as the heat transfer surface.

The remaining compounds rise through the lower column's rectification section 9, which prevents compound C from entering the upper column. Vapors rising out of the top of the small lower column are the feed stream to the upper column, and liquid descending through the top of the lower column is the reflux stream to the lower column. Fractionation in the stripping section 17 of the upper column results in the purification of a stream of compound B in the outer portion of the annulus. This stream is removed in line 14. Vapors for this purification are derived from the reboiler means 13 located in the bottom of the upper column. Vapors enriched in component A rise through the stripping section 17 in the annulus between the lower column's continuing walls 22 and the outer wall of the upper column.

The vapors leaving the top of the lower column and those leaving stripping section 17 enter rectification section 16 which produces an overhead vapor stream rich in compound A which is removed in line 18. This overhead vapor stream is then passed through cooler 19 to cause its condensation into a liquid which is collected in receiving vessel 20. Part of this liquid is returned to the apparatus in line 15 as reflux, and a second part is removed in line 21 as a product stream.

This description and drawing of the invention are intended to present only its basic principles, and are not intended to limit its application to this specific example. For the purposes of simplicity and clarity, needed process equipment such as valves, pumps and controls have not been shown. Modifications to adapt the present invention to a wide variety of possible applications are within the scope of the prior art.

DETAILED DESCRIPTION OF THE INVENTION

Fractionation employs a multiplicity of distillation, or vapor-liquid equilibrium, stages stacked upon one another inside a vessel to separate mixtures of substances having different boiling points. Fractionation can also be performed in a column filled with regular shaped material referred to as packing, which provides surface area for vapor-liquid contact, pockets to hold liquid, and openings for vapor and liquid flow. The method is the same with both types of columns. Lower boiling, more volatile, components contained in the liquid pass into vapor phase in an attempt to reach equilibrium. The vapor formed in each level is therefore relatively rich, as compared to the liquid, in the more volatile components. These volatile components gradually move stage by stage to the top of the column as the vapor rises.

The feed stream to be split is normally introduced at some point near the middle of the column, and marks the division between a stripping section, defined as the section of trays above the feed point, and the rectification section, defined as the section of trays below the feed tray. Rectification refers to the purification of a distillate, and stripping refers to purification of a bottoms stream. Rectification occurs as the less volatile (heavy) components of the vapor transfer into the liquid phase. A liquid reflux stream formed by the condensation of vapor removed from the top of the column is fed to the top tray to provide the liquid phase needed for the necessary vapor-liquid contacting. Stripping occurs in the section of the column below the feed point as the more volatile (light) components transfer into the vapor phase and the heavy components descend to the bottom of the column. The vapor phase is produced by a heating means in the bottom of the column referred to as a reboiler, and initially has a relatively low concentration of the more volatile component. It is a common practice to form a vapor phase by heating a portion of a product stream being removed from the bottom of the column in an external reboiler.

Either a rectification section or a stripping section is required for each pure product stream removed from a fractionation column. To illustrate this point, if it is assumed that three compounds, A, B, and C, are to be separated, it is necessary to first separate out one of the compounds, for example A, and then to split the other two. To perform this, the mixture of the three compounds is fed to a first fractionation zone operated at conditions chosen to remove either the most volatile compound, A, as the overhead product or the least volatile compound, C, as the bottoms product. The two remaining compounds, B and C or A and B, are then withdrawn from the opposite end of this first fractionation zone and fed to a second fractionation zone which removes the most volatile remaining compound as an overhead product and the less volatile compound as a bottom product. If this separation of three compounds was attempted in a single fractionation column by withdrawing compound B as a sidecut taken between the feed point and either end of the vessel, the sidecut would be contaminated by a second compound, either A or C, being removed at that end of the vessel. The liquid removed from a sidecut tray is in contact with the vapor or liquid carrying the second compound to the ends of the vessel and this contamination is therefore unavoidable. This problem is solved in a crude oil column used to separate the raw crude into several different product cuts by steam stripping each side cut that is removed in a second column, and then returning the light stripped out material to the crude column above the point where the side cut is removed.

An object of the present invention is to provide an apparatus for the separation of three compounds into pure streams in a unitary vessel. The word vessel is intended to mean an independent structure enclosing two or more fractionation sections. By this terminology, a normal fractionation column with an intermediate feed point would be considered a vessel which contains one fractionation unit consisting of one stripping section and one rectification section. A second object of the present invention is the reduction of the initial construction costs of an apparatus capable of producing more than two pure product streams. A further object of the present invention is the reduction of the cost of operation of a fractionation apparatus designed to produce more than two pure product streams during periods of operation when only two product cuts are required.

The preferred embodiment is that shown in the drawing and consists of two fractionation units, with a smaller diameter fractionation unit stabbed into the bottom of a larger diameter unit. A feed stream inlet means is provided near a mid-point of the lower unit. The bottom part of the lower fractionation unit is therefore a stripping section wherein a purified stream of the least volatile component in the feed stream is formed. The internal structure of the stripping section may be constructed in any of the suitable arrangements known to the prior art. The part of this lower unit above the feed point is a rectification section which functions similar to the prior art in assuring that very little of the least volatile component reaches the upper sections of the apparatus. It differs from the prior art in that it has no external reflux means, and because it is in open communication with the upper unit. The remaining lighter portion of the feed mixture passes through the top of this lower unit as the feed to the upper fractionation unit. The outer part of the annulus formed by the overlapping units is the bottom part, or stripping section, of the upper unit. A second pure component stream is removed from this stripping section and consists of a middle boiling range material. The lightest components in the feed are purified in the uppermost rectification section within the vessel, where an external reflux system is located to supply the necessary liquid reflux to the entire apparatus. The preferred embodiment therefore utilizes one outer vessel containing two stripping sections, two rectifying sections, one reflux system and two reboilers to produce three high purity products.

The embodiment shown in the drawing may be expanded to include three fractionation units. It would be used when the feed stream contained only low percentages of three heavy components. The number of individual units which may be stacked on top of one another is limited by the practicality of operation, and by design considerations based on the maximum rate at which vapor and liquid can be transported through the smaller sections of the vessel without impairing operation.

The invention may be described as a fractionation apparatus capable of producing three pure component streams which comprises: (a) a lower first, and an upper, second fractionation unit, each of the units being cylindrical in cross-sectional configuration, each of the fractionation units having an upper rectification section and a lower stripping section, the rectification section of the lower first unit being of less diameter than the second unit and extending upward into the second unit a substantial distance, whereby an annular chamber having a series of fractionation trays therein is provided between the first and second units; (b) means to introduce a feed stream to the apparatus at a point located between the top and bottom of the lower first fractionation unit; (c) reboiler means located near the bottom of the stripping section of each of the fractionation units; (d) means to provide external reflux to the rectification section of the upper fractionation unit; (e) means to remove a product stream from the bottom of each of the stripping sections; and, (f) means to remove a product stream from the top of the rectification section of the upper fractionation unit.

There is no requirement that the two columns have the same type of internal construction. They may, for instance, use a different type of tray or a different tray spacing. It is also possible for the stripping and rectification sections of a single unit to differ in cross-sectional area or design. The stripping section of the lower column may be as large in diameter as the rectification section of the upper column. This would be the case if the outer vessel was uniformly cylindrical and the rectification section of the lower column had a smaller diameter than the stripping section. If practical, a cylindrical outer vessel is preferred since it reduces design problems encountered in supporting the upper column.

The design of the columns, trays, reflux and reboiler systems will vary with the material being fractionated and flow rate of the feed stream. Details of the many possible internal and external variations of the present invention are well known to those skilled in the art of fractionation.

With the invention, construction costs are lowered by the use of a single foundation where two were required in the prior art, by the possible use of a lower gauge metal in the rectification section of the lower fractionation unit, and by the elimination of reflux system piping and controls.

Since the feed to the upper column is in the form of a vapor, a greater amount of cooling capacity is required in the reflux systems of the upper column. However, this increase in cooling requirements is balanced by the absence of a reflux system in the bottom unit, and by a reduction in reboiler duty of the upper units. Actually, the cooling is just performed in another location. It should be noted that with the apparatus of the present invention, there is no need to preheat the feed to the upper column since the feed is already vaporized.

Since in most cases it is the rate of vapor passage that is the controlling design factor in sizing a column for the required diameter, the area required of the rectification section of the lower fractionation unit will be determined by the quantity of top and middle product stream material in the feed stream, which is the amount of vapor which must travel upward through the inner section. The height of the outer annular volume will be set by the minimum number of fractionation stages required to assure that a high purity middle product stream is produced. The feed stream may be charged to the lower unit at any feasible point and is not restricted to the location shown on the drawing. The design criterion for placement of the feed point is the adequate rectification of the material which is discharged from the top of the lower fractionation unit.

To produce three pure product streams, the feed stream must enter the apparatus through the lowest stabbed-in fractionation unit. It is important to emphasize that the feed stream must enter the lowest unit which is stabbed into another unit. If, as in the drawing, each unit is larger than the one below it, this is the same as saying the feed must be to the smallest unit. If the feed stream is charged to a different unit, at least one of the products will not be of high purity although the others may be unaffected. This can be easily visualized by referring to the drawing. If the feed point is moved up to a point in the upper fractionation unit, at least some of the heaviest components which would normally descend to the bottom of the lower unit will descend instead into the annulus and become trapped. The middle product stream will then be contaminated with the heaviest component.

I claim as my invention:

1. A fractionating apparatus capable of producing three pure component streams which comprises:
    a. a lower first, and an upper, second fractionation unit, each of the units being cylindrical in cross-sectional configuration, each of the fractionation units having an upper rectification section and a lower stripping section, the rectification section of the lower first unit being of less diameter than the second unit and extending upward into the second unit a substantial distance, thereby forming an annular chamber, said chamber having therein a series of fractionation trays extending between said first and second units;
    b. means to introduce a feed stream to the apparatus at a point located between the top and bottom of the lower first fractionation unit;
    c. reboiler means located near the bottom of the stripping section of each of the fractionation units;
    d. means to provide external reflux to the rectification section of the upper fractionation unit;
    e. means to remove a product stream from the bottom of each of the stripping sections; and,
    f. means to remove a product stream from the top of the rectification section of the upper fractionation unit.

2. The apparatus of claim 1 wherein the substantial distance which the lower first fractionation unit extends into the upper unit is in the amount of about one-half the height of the lower first unit.

3. The apparatus of claim 1 wherein the diameter of the rectification section of the upper fractionation unit is equal to the diameter of the stripping section of the lower, first fractionation unit.

* * * * *